(12) United States Patent
Lee

(10) Patent No.: US 7,726,025 B2
(45) Date of Patent: Jun. 1, 2010

(54) STRUCTURE FOR PREVENTING REFRIGERANT FROM LEAKING IN HEAT EXCHANGER AND METHOD FOR FORMING THE SAME

(75) Inventor: Jang Seok Lee, Incheon-si (KR)

(73) Assignee: LG Electronics Inc., Seoul (KR)

( * ) Notice: Subject to any disclaimer, the term of this patent is extended or adjusted under 35 U.S.C. 154(b) by 546 days.

(21) Appl. No.: 11/668,703

(22) Filed: Jan. 30, 2007

(65) Prior Publication Data

US 2007/0130770 A1   Jun. 14, 2007

Related U.S. Application Data

(62) Division of application No. 10/368,343, filed on Feb. 20, 2003, now abandoned.

(30) Foreign Application Priority Data

Aug. 27, 2002  (KR) ................ 2002/50760

(51) Int. Cl.
B23P 15/26  (2006.01)
(52) U.S. Cl. ............... 29/890.043; 29/890.03; 29/890.032; 29/890.052; 29/890.038; 29/890.045; 29/890.053; 165/79; 165/173; 165/178
(58) Field of Classification Search ............ 29/890.052, 29/890.032, 890.038, 890.045, 890.053, 29/890.054, 890.043, 525.14; 165/79, 173, 165/178, 152, 153
See application file for complete search history.

(56) References Cited

U.S. PATENT DOCUMENTS

| 4,132,264 | A | 1/1979 | Furlong |
| 4,386,652 | A | 6/1983 | Dragojevic |
| 4,926,933 | A | 5/1990 | Gray |
| 5,865,244 | A * | 2/1999 | Moser ............ 165/173 |
| 6,094,816 | A * | 8/2000 | Doshi ............ 29/890.043 |
| 6,180,038 | B1 | 1/2001 | Cesaroni |
| 6,575,232 | B1 * | 6/2003 | Nakado et al. ............ 165/173 |
| 2001/0013408 | A1 * | 8/2001 | Lee et al. ............ 165/150 |
| 2002/0088526 | A1 * | 7/2002 | Lee ............ 156/73.1 |
| 2004/0081777 | A1 | 4/2004 | Williams et al. |

FOREIGN PATENT DOCUMENTS

| FR | 2743621 | 7/1997 |
| FR | 2785375 | 5/2000 |

(Continued)

OTHER PUBLICATIONS

English language Abstract of FR 2743621.

(Continued)

*Primary Examiner*—Rick K Chang
(74) *Attorney, Agent, or Firm*—McKenna Long & Aldridge LLP

(57) ABSTRACT

A refrigerant leak-preventive structure in a heat exchanger is described. The refrigerant leak-preventive structure includes a tube group having refrigerant leak-preventive grooves recessed at ends of the fin-tubes group, and headers having refrigerant leak-preventive projections formed by double injection molding solution introduced into and cooled in the refrigerant leak-preventive grooves when being coupled with the both ends of the tube group by a double injection molding.

6 Claims, 5 Drawing Sheets

| FOREIGN PATENT DOCUMENTS | | |
|---|---|---|
| GB | 1188981 | 4/1970 |
| JP | 62-204934 A | 9/1987 |
| JP | 6 3003194 | 1/1988 |
| JP | 11-277540 A | 10/1999 |
| JP | 2000-146044 A | 5/2000 |
| WO | 97/28953 | 8/1997 |

OTHER PUBLICATIONS

English language Abstract of JP 63-3194.
English language Abstract of JP 62-204934 A.
English language Abstract of JP 11-277540 A.
English language Abstract of JP 2000-146044 A.

* cited by examiner

STRUCTURE FOR PREVENTING REFRIGERANT FROM LEAKING IN HEAT EXCHANGER AND METHOD FOR FORMING THE SAME

CROSS-REFERENCE TO RELATED APPLICATIONS

The present application is a division of copending U.S. patent application Ser. No. 10/368,343, filed Feb. 20, 2003, the entire content of which is hereby incorporated by reference in its entirety.

BACKGROUND OF THE INVENTION

1. Field of the Invention

The present invention relates to a heat exchanger, and more particularly, to a refrigerant leak-preventive structure in a heat exchanger of a refrigerator, in which refrigerant pressurized by a compressor to a high temperature and high pressure or a low temperature and low pressure flows. The refrigerant leak-prevention structure prevents leakage of refrigerant and introduction of external air both of which are generated at bonded sections between refrigerant tubes and headers. However, the heat exchanger of the invention is not restricted only to the refrigerator.

2. Description of the Related Art

A refrigerator includes a compressor, a condenser, a throttle valve and an evaporator all of which constitute a system operation in the order named. In the refrigerator, heat is absorbed in the evaporator while more heat is discharged out of the refrigerator via the condenser. In particular, the condenser and the evaporator function as a heat exchanger by absorbing and discharging heat.

The conventional heat exchanger performs heat exchange of refrigerant with a pair of metal refrigerant tubes for introducing or discharging refrigerant, headers fixed to both ends of the metal refrigerant tubes and a plurality of fins formed in outer peripheries of the metal refrigerant tubes. In particular, the fins and the refrigerant tubes are coupled by using expansion of the refrigerant tubes and thus typically have a predetermined gap between the metal bodies.

Owing to the metal structure, however, the conventional heat exchanger made of metal has a problem in that noises are generated at contact points between the metal bodies in on/off operation of the refrigerator, thereby causing inconvenience to the user. In order to improve this problem, a plastic heat exchanger is generally used at present.

FIG. 1 illustrates a conventional plastic heat exchanger in the form of a tri-tube heat exchanger having an integral structure of a fin, a refrigerant tube and a defrosting tube.

Referring to FIG. 1, the conventional plastic heat exchanger 112 includes a refrigerant tube, a fin and tube group or fin-tubes group 118 which is defined by combining a number of fins and defrosting tubes, fin-tubes group headers or headers 120 disposed at both ends of the fin-tubes group 118, right and left header tanks 124 and 126 extended from the headers 120. In particular, the fin-tubes group 118 indicates an array of ducts, in which at least a refrigerant tube and fins are integrally formed in each duct.

A method of fabricating the above plastic heat exchanger, in particular, for bonding the fin-tubes group 118 and the headers 120 has been disclosed in U.S. patent application Ser. No. 09/954,056, which will be briefly described as follows.

The undesignated reference numbers 130 and 132 indicate an inlet tube and an outlet tube of refrigerant, respectively.

FIG. 2 illustrates a process of combining the fin-tubes group 118 and the headers 120.

Referring to FIG. 2, the process of combining the fin-tubes group 118 and the headers 120 includes: primarily forming plastic into the fin-tubes group 118; double extruding at both ends of the plastic fin-tubes group 118 to form the headers 120; and placing thermal fusion jigs 136 into interspaces of the plastic headers 120 in a supporting fashion and thermal pressing an upper central portion of the fin-tubes group 118 using a thermal fusion apparatus 128 having thermal fusion molds 134 to thermal fuse the fin-tubes group 118 and the headers 120 more strongly.

In particular, the thermal fusion molds 134 are in the shape of an overturned triangle so that ends of the fin-tubes group 118 are flared strongly bonding to the header 120. The non-described numeral 140 indicates power lines.

The headers 120 are thermal fused to both ends of the fin-tubes group 118 according to the above fusion process, thereby possibly preventing abnormal noise from occurring in on/off operation of a refrigerator which has been a problem in the conventional heat exchanger made of metal.

In particular, since the fin-tubes group 118 is bonded to the header 120 via thermal fusion, there are advantages in that the plastic heat exchanger 112 is readily fabricated and the manufacturing cost thereof can be reduced.

Where the conventional heat exchanger 112 constructed according to the above bonding process is utilized as an evaporator, refrigerant is introduced under an atmospheric pressure (e.g., 0.9 to 1 atm.) similar to the atmospheric pressure and thus refrigerant leak or introduction owing to differential pressure may not take place.

However, where the conventional heat exchanger 112 is utilized as a condenser, refrigerant having a high temperature and pressure (e.g., 9 to 10 atm.) is introduced as heated and pressurized by a compressor.

In this circumstances, there is a problem that the high pressure of refrigerant opens between the fin-tubes group 118 and the headers 120 which are bonded through thermal fusion and thus refrigerant leaks through openings formed as above.

Furthermore, when refrigerant leaks from the heat exchanger 112 as above, it is impossible to maintain the refrigerant pressure within the condenser 112 in a set cooling cycle or the refrigerant pressure of the entire cooling cycle. As the refrigerant pressure is decreased as above, the refrigerator fails to properly perform the cooling cycle while the discharged quantity of refrigerant may not correspond to the set temperature of the refrigerator.

SUMMARY OF THE INVENTION

The present invention has been made to solve the foregoing problems and it is therefore an object of the present invention to provide a refrigerant leak-preventive structure capable of realizing strong fusion between a tube group and headers to effectively prevent leakage of the refrigerant.

To achieve these objects and other advantages and according to the purpose of the invention, as embodied and broadly described herein, there is provided a refrigerant leak-preventive structure in a heat exchanger which includes a plastic tube group and plastic headers combined with the tube group by a double injection molding. The structure includes: refrigerant leak-preventive grooves formed at least on outer peripheries of both ends of the tube group through which refrigerant flows, and for preventing leak of the refrigerant between the tube group and the headers when the refrigerant pressurized by a compressor is introduced into the heat exchanger; and refrigerant leak-preventive projections formed by an injection molding solution of the headers introduced into and cooled in the refrigerant leak-preventive grooves during a double injection molding of the headers, and correspondingly engaged with the refrigerant leak-preventive grooves.

According to another aspect of the invention to obtain the above objects, there is provided a method for forming a refrigerant leak-preventive structure in a heat exchanger. The method includes the steps of: forming refrigerant leak-preventive grooves on outer peripheries of both ends of a tube group; and double injection-molding headers at the both ends of the tube group.

According to the above structure and method, refrigerant leak potentially occurring in the heat exchanger can be effectively restrained.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Reference will now be made in detail to a preferred embodiment of the present invention with reference to the attached drawings.

Figure 1:
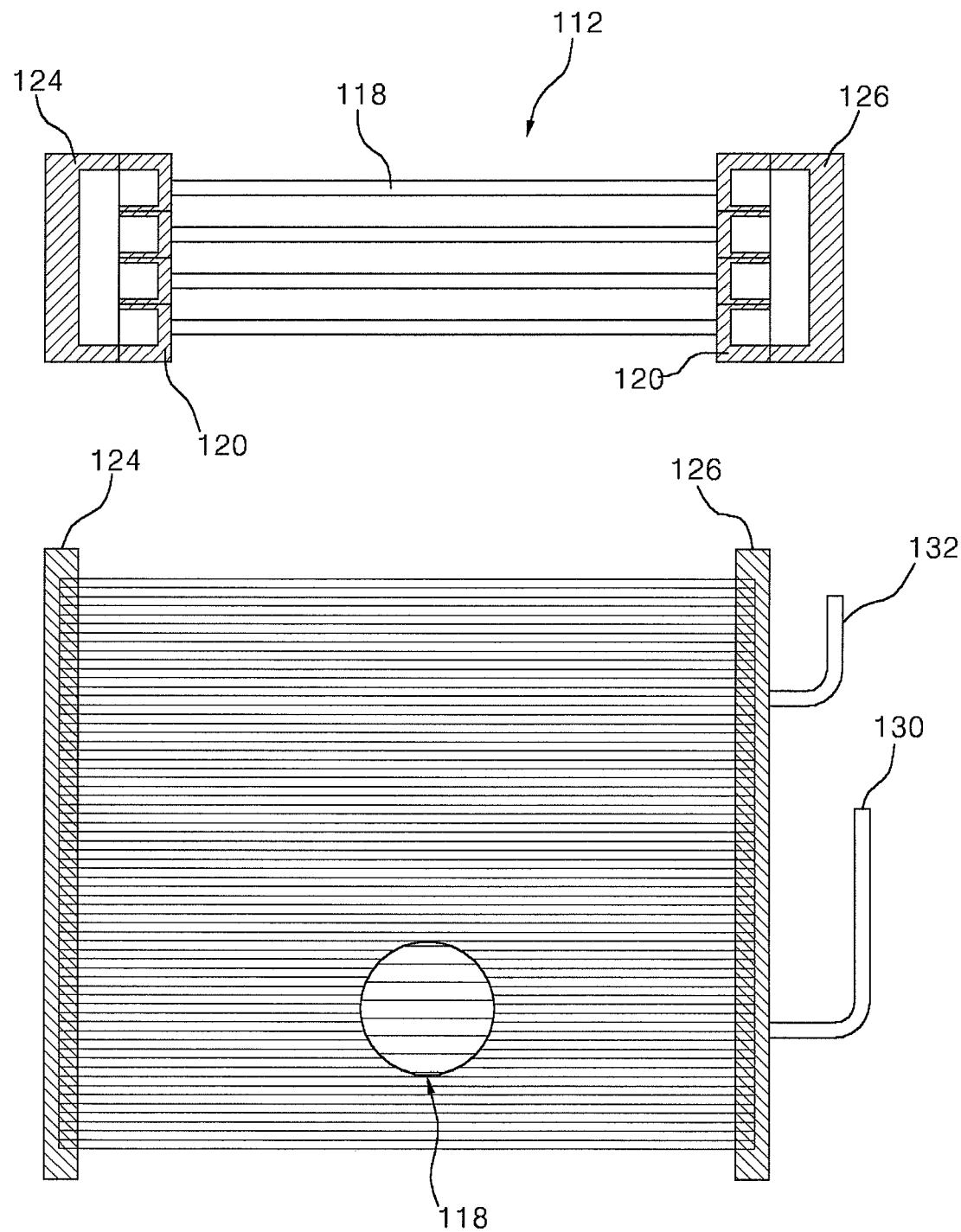
FIG. 1 illustrates a conventional plastic heat exchanger.
Figure 2:
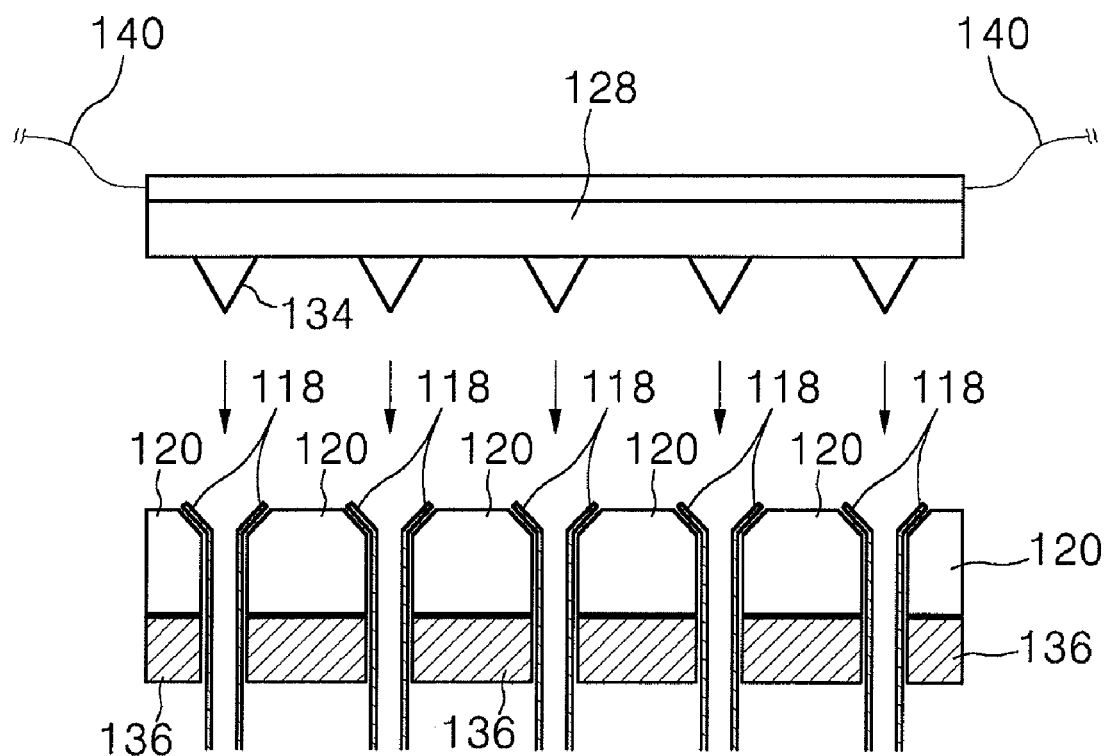
FIG. 2 illustrates a forming process of a conventional plastic heat exchanger.
Figure 3:
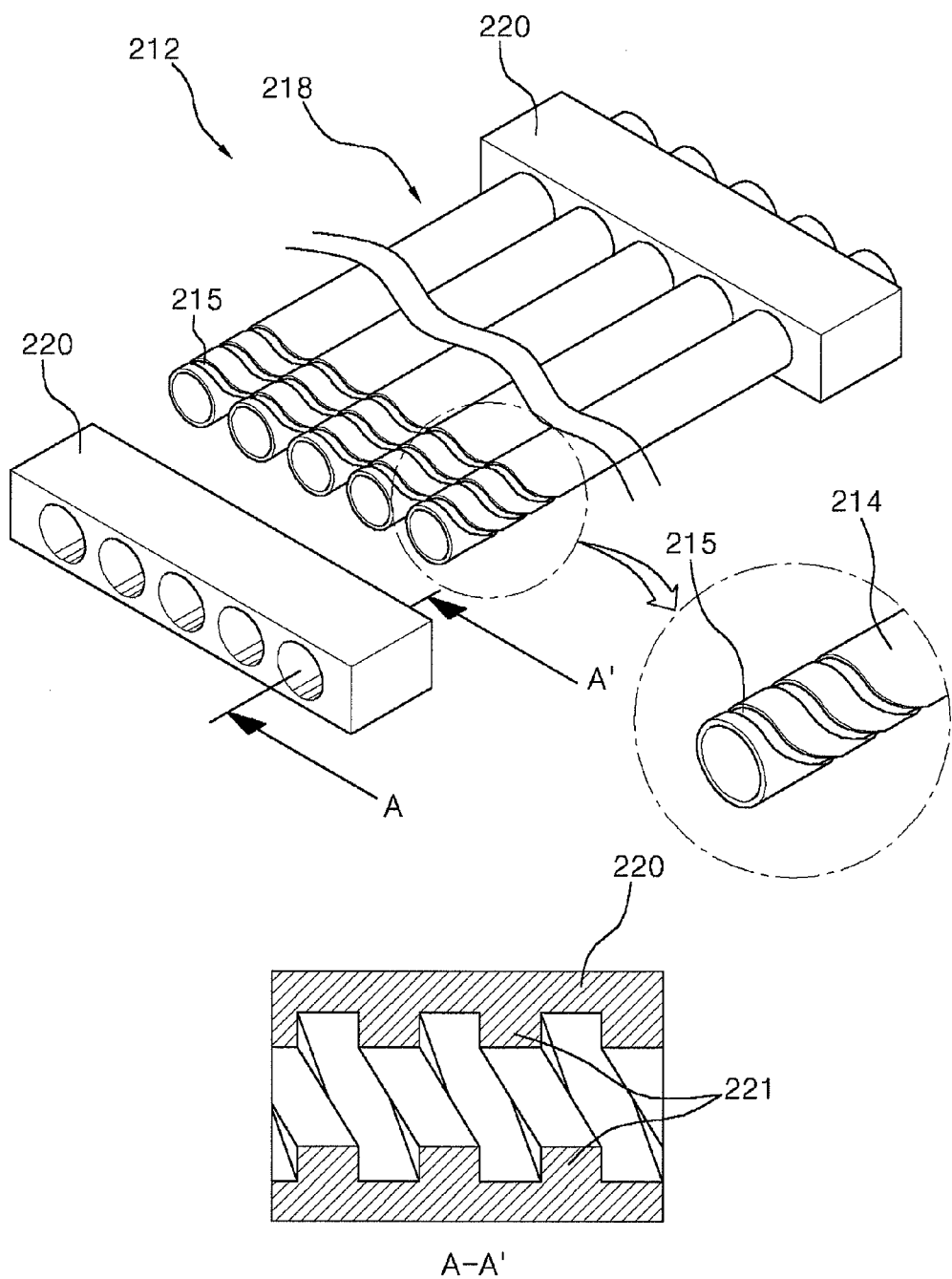
FIG. 3 illustrates a characteristic structure of a heat exchanger according to an embodiment of the invention and a fabrication method thereof.

FIG. 3 is an exploded perspective view and a partially enlarged view of a heat exchanger of the invention.

Explaining a refrigerant leak-preventive structure of a heat exchanger 212 of the invention with reference to FIG. 3, the refrigerant leak-preventive structure includes refrigerant leak-preventive grooves 215 formed at both ends of a tube group 218 and refrigerant leak-preventive projections 221 which are formed by injection double molding solution flowing into the refrigerant leak-preventive grooves 215 during the injection molding of fin-tubes headers 220.

For example, each of the refrigerant leak-preventive grooves 215 is formed on an outer periphery of a refrigerant tube 214 having a high pressure in the tube group 218. In particular, each of the refrigerant leak-preventive grooves 215 is formed in a spiral configuration on the outer periphery of the tube group 218.

The refrigerant leak-preventive grooves 215 are preferably formed at least on the refrigerant tubes 214 of the tube group 218.

By the injection molding, the refrigerant leak-preventive projections 221 are formed in a configuration which is substantially identical with that of the refrigerant leak-preventive grooves 215.

The refrigerant leak-preventive structure of the heat exchanger having the above construction shows a refrigerant leak prevention operation, which will be described in detail as follows.

When refrigerant of a high pressure is introduced into the heat exchanger 212 from a compressor, the high pressure of the refrigerant is applied to fused faces between the tube group 218 and the headers 220 of the heat exchanger 212 which were bonded through thermal fusion under high pressure.

The injection molding permits the refrigerant leak-preventive grooves 215 to have a substantially identical configuration with the refrigerant leak-preventive projections 221. That is, the refrigerant leak-preventive projections 221 are formed integral with the headers 220 by the double injection molding in a state that they are correspondingly engaged with the tube group 218.

During the double injection molding of the headers 220, the injection molding solution flows into and then cooled in the refrigerant leak-preventive grooves 215, to form the refrigerant leak-preventive projections 221 on the outer peripheries of the both ends of the tube group 218.

The injection molding permits the refrigerant leak-preventive grooves 215 to have a substantially identical configuration with the refrigerant leak-preventive projections 221. That is, the refrigerant leak-preventive projections 221 are formed integral with the headers 220 by the double injection molding in a state that they are correspondingly engaged with the tube group 218.

As the refrigerant leak-preventive grooves 215 and the refrigerant leak-preventive projections 221 are engaged into a corresponding fashion as above, the strong engaging force due to the tooth-shaped engagement between the refrigerant leak-preventive grooves 215 and the refrigerant leak-preventive projections 221 does not allow the refrigerant to flow out to the outside although the refrigerant of high-pressure leaks in the bonded faces between the tube group 218 and the headers 220.

In other words, the corresponding engagement between the tube group 218 and the headers 220 allows strong and reliable bonding and makes the leak paths complicated, thereby effectively restraining refrigerant leak.

Figure 4:
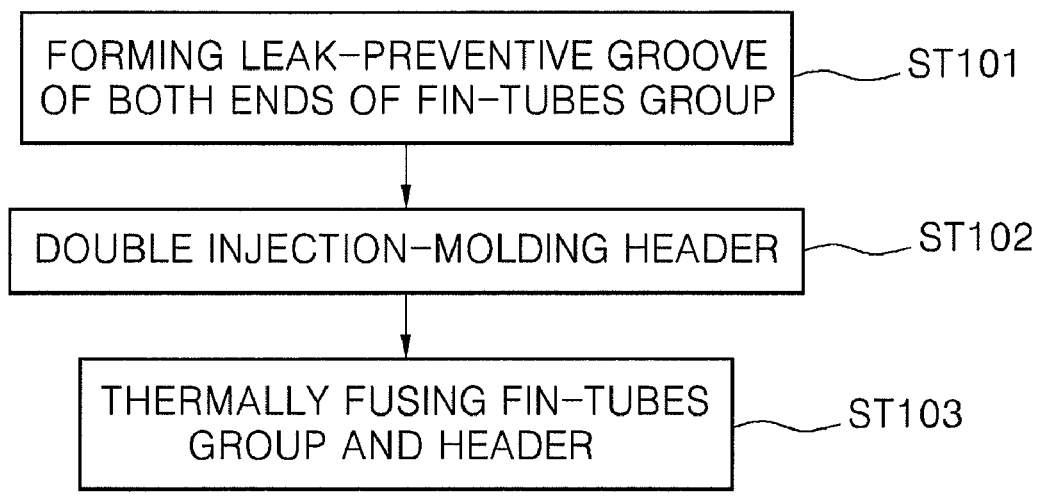
FIG. 4 is a flowchart illustrating a method for forming a heat exchanger according to the invention.

FIG. 4 is a flow chart illustrating a forming process of the heat exchanger of the invention.

Referring to FIG. 4, the forming process of the tube group 218 and the headers 220 includes the steps of: forming the refrigerant leak-preventive grooves 215 on the outer peripheries of the ends of the tube group 218, in particular, of the refrigerant tubes 214 through which high pressure refrigerant flows (ST 101); double injection-molding the headers 220 at the ends of the tube group 218 (ST 102); and thermally fusing the tube group 218 and the headers 220 via jigs and a heating source (ST 103).

The thermal fusing step (ST 103) may be substantially identical with a conventional method and thus detailed description thereof will be omitted hereinafter.

According to the above process, the tube group 218 is coupled with the headers 220 in such a fashion that the refrigerant leak-preventive grooves 215 and the refrigerant leak-preventive projections 221 are formed, so that leak of the refrigerant is effectively prevented.

Figure 5:
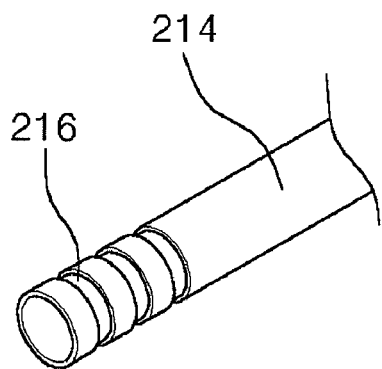
FIG. 5 illustrates an alternative embodiment of the invention.

FIG. 5 illustrates an alternative embodiment of the invention.

Referring to FIG. 5, a plurality of refrigerant leak-preventive grooves 216 are formed in the shape of a separate ring on outer walls at both ends of a refrigerant tube 214 of the tube group 218. In case where the aforementioned ring-shaped refrigerant leak-preventive grooves 216 are applied, refrigerant leak-preventive projections 221 are also formed in a ring shape during their double injection molding.

The configurations of the above refrigerant leak-preventive grooves 215 and 216 are not restricted to the aforementioned examples such as the spiral shape and the circular shape. The refrigerant leak-preventive grooves 215 and 216 may be at least two repeatedly formed so as to perform the identical function. Further, those skilled in the art who understand the invention may readily contemplate other shape of refrigerant leak-preventive grooves performing equivalent or similar functions.

Figure 6:
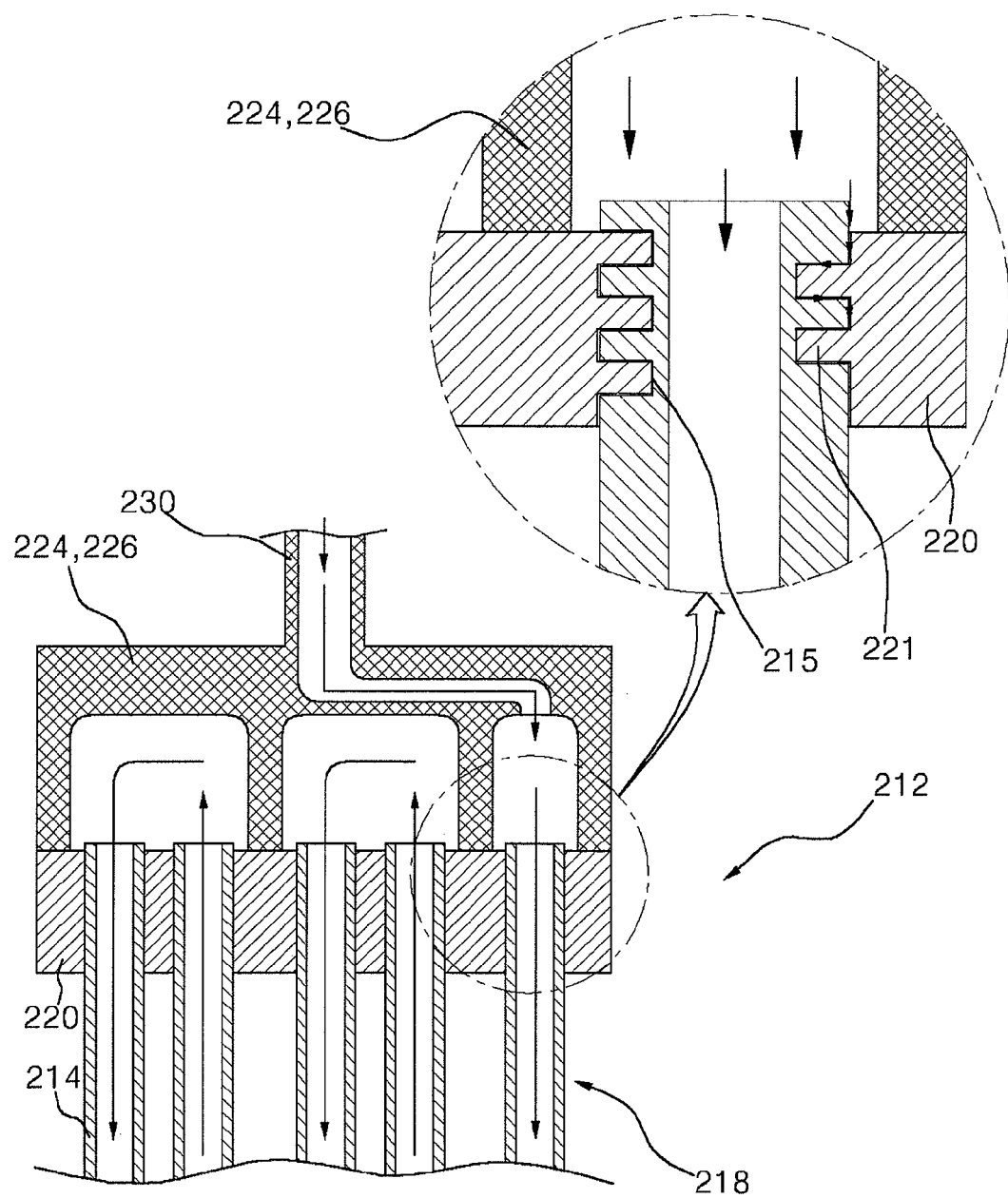
FIG. 6 illustrates operation of the heat exchanger of the invention.

FIG. 6 illustrates the operation of the refrigerant leak-preventive structure of the heat exchanger of the invention.

As shown in FIG. 6, after pressurized to a high temperature and high pressure (e.g., 9 to 10 atm.) in a compressor, refrigerant is introduced into the heat exchanger 212 where it is condensed through heat exchange with external air through a cooling cycle of the refrigerator. The high pressure of the refrigerant allows a high pressure to be applied between the tube group 218 and the headers 220 constituting the heat exchanger 212.

However, the refrigerant leak-preventive grooves 215 of the invention together with the refrigerant leak-preventive projections 221, which are formed simultaneous with double injection molding of the tube group 220, strongly couples the tube group 218 with the headers 220, thereby preventing leak of refrigerant.

Even though the high pressure causes refrigerant to leak at all, leaked refrigerant is blocked from further flowing out owing to the complicated leak paths and adhering force applied in several directions so that refrigerant leak can be substantially prevented. As a result, this construction can maintain the refrigerant pressure at a proper level in a refrigerant-cycling system, thereby ensuring reliability in the operation of the refrigerator.

Non-described numerals 224 and 226 indicate right and left header tanks, and 230 indicates an inlet tube of refrigerant.

The refrigerant leak-preventive structure of the heat exchanger of the invention having the above construction can be applied to the condenser, in which refrigerant pressurized up to the high temperature and high pressure (e.g., 9 to 10 atm.) in the above compressor is condensed through heat exchange with external air. The refrigerant leak-preventive structure of the invention can be also applied to an evaporator to restrict leak of refrigerant and introduction of external air.

As an effect, the invention can prevent refrigerant leak which may minutely flow out between the tube group and the headers of the heat exchanger.

Moreover, the invention further enhances the pressure-resistant strength of the heat exchanger so that it can properly cope with elevated refrigerant pressure which is set in the cooling cycle.

What is claimed is:

1. A refrigerant leak-preventive method in a heat exchanger, the method comprising:
    forming, by a first injection molding, at least one refrigerant leak-preventive deformation on an outer periphery of at least one end of a tube group, wherein the tube group is made of plastic;
    forming, by a second injection molding, headers at opposite ends of the tube group, wherein at least one refrigerant leak-preventive projection of the headers:
        is substantially identical with the at least one refrigerant leak-preventive deformation of the tube group, and
        is formed integrally with the at least one refrigerant leak-preventive deformation of the tube group; and
    combining header tanks with the headers.

2. The refrigerant leak prevention method according to claim 1, further comprising:
    thermally fusing the tube group and the headers with a jig and a heating source, after the tube group is second injection molded with the header tanks.

3. The refrigerant leak prevention method according to claim 1, wherein the refrigerant leak-preventive deformation is groove formed on outer peripheries of refrigerant tubes.

4. The refrigerant leak prevention method according to claim 1, wherein the at least one refrigerant leak-preventive projection is formed by impregnating an injection molding solution into the at least one refrigerant leak-preventive deformation.

5. The refrigerant leak prevention method according to claim 1, wherein the refrigerant leak-preventive deformation has a spiral shape.

6. The refrigerant leak prevention method according to claim 1, wherein the refrigerant leak-preventive deformation has a circular shape.

* * * * *